July 20, 1943.  J. E. PAUL  2,324,532
LUMINESCENT MARKER
Filed Oct. 1, 1941
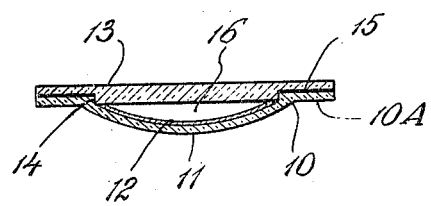
INVENTOR
John E. Paul
BY
ATTORNEYS Patented July 20, 1943

2,324,532

UNITED STATES PATENT OFFICE 2,324,532

LUMINESCENT MARKER

John E. Paul, South Orange, N. J., assignor to United States Radium Corporation, New York, N. Y., a corporation of Delaware Application October 1, 1941, Serial No. 413,106

10 Claims. (Cl. 250—71)

This invention is concerned with luminous markers and particularly with self-activated luminous markers for military use. The invention contemplates improved radio-active luminous markers or badges which may be stationary or carried by soldiers or by vehicles or animals to mark location in the dark and provides improvements in methods for producing such markers.

It has been proposed to employ radio-active luminous materials as markers, but such markers for military use present a number of special problems which heretofore have not been solved. Pigments and the like may be rendered luminous by the presence therein of radio-active substances. The radio-active substances decompose continuously and give off rays (which induce luminescence of the pigment) and emanations, particularly radon gas, all of which may be injurious to a variety of living organisms, including humans, unless proper precautions are taken. Moreover, commercially practicable radio-active pigments, such for example as zinc sulfide pigment containing radium salts, are hygroscopic and absorb moisture readily with consequent rapid deterioration. It is necessary, therefore, to protect the pigment containing the radio-active ingredient from exposure. The protective medium employed must be transparent so as to permit observation of the luminosity; it must be substantially proof against deterioration under radium bombardment; and it must act as a shield to retain radon or thoron as well as alpha rays so as to prevent the escape of energy which should be employed to illuminate the pigment. The severe conditions of military service impose further requirements upon the medium, in that it must be substantially weather-proof and rugged enough to withstand severe shock without breaking.

A great variety of materials, which at first would appear to be satisfactory for use as protective media, are in fact unsatisfactory. Glass is unsatisfactory because it is brittle and because under radium bombardment it turns brown or violet, so that its light transmission characteristics are badly impaired. Plastics are, in general, much less brittle than glass and would therefore appear to be more satisfactory for use as protective media. But in many instances they are useless because they deteriorate under radium bombardment, particularly in the presence of moisture. By way of example, cellulose nitrate plastics discolor rapidly under radium bombardment and develop an opacity which may be yellow-brown or gray or purple. Ethyl cellulose, under the combined effect of moisture and radium bombardment, swells and discolors to the point of uselessness. Cellulose acetate, under similar conditions, swells and acquires opacity of various colors. Urea-formaldehyde resins suffer severe discoloration when subjected to radium bombardment. Most vynilite resins tend to swell when subjected to radium bombardment—especially in the presence of moisture.

I have discovered, however, that organic materials which are thermo-plastic or thermo-setting and also substantially non-absorbent with respect to water are, in general, substantially unaffected by radium bombardment from a radio-active zinc sulfide pigment, providing that the latter is enclosed in a dry space—preferably a space having a sub-atmospheric pressure, i. e., a partial vacuum. Based upon this and other discoveries discussed hereinafter, I have developed a luminous marker which meets military requirements. The marker of my invention is safe, long-lived, rugged and durable and does not deteriorate substantially upon exposure to wide extremes of weather conditions.

The preferred marker of my invention comprises substantially dry, i. e., water-free, zinc sulfide containing a radio-active material and preferably also an adhesive, the zinc sulfide being hermetically sealed in a container having a window of transparent thermoplastic or thermo-setting organic material that is substantially non-absorbent with respect to water and is of sufficient thickness to be impenetrable by emanations and alpha rays from the radio-active material. The container should be maintained under a partial vacuum and, in my preferred structure, the pigment is hermetically sealed in a dry (i. e. substantially water-free) state between two discs of organic thermoplastic material that is substantially non-absorbent with respect to water, the discs being bonded together thermoplastically at their peripheries under such conditions that a partial vacuum is created and maintained in the space within the discs. At least a portion of one of the discs should be transparent to permit observation of the luminescence. Thus, the front disc may be transparent and the back opaque.

A variety of organic materials may be employed in making the container for the luminescent pigment provided that the material is thermoplastic and provided further that it has substantially no absorbent capacity for water. Examples of preferred materials include polystyrene and acrylate plastics. None of these plastics are altered substantially by the combined effect of moisture and radium bombardment. Thus, polystyrene resins and acrylate resins, such for example as methyl methacrylate and others of the "Lucite" type, do not discolor or become opaque or swell under the combined effect of moisture and radium bombardment, as is the case with plastics that are water absorbent.

In assembling the marker of my invention, it is essential that the radio-active zinc sulfide pigment be substantially moisture-free before it is sealed in the plastic case. It is my preferred practice to apply the radio-active zinc sulfide pigment in a suitable adhesive base to the inside surface of the transparent plastic window. The applied pigment is thoroughly dried and thereafter sealed hermetically within the case.

Thus, the pigment may be applied to the back or concave side of a dished polystyrene disc and thoroughly dried thereon by heat or vacuum. The dried disc is then affixed to another polystyrene disc (which may or may not be transparent) by joining the juxtaposed edges of the discs by heat and pressure. The application of the heat and pressure results not only in the formation of a hermetic seal between the edges of the two discs but also results in the creation of a partial vacuum in the space between the discs.

For convenience in assembly, one of the discs, preferably the back disc, should be provided with a boss which fits into a depression in the other disc.

My invention will be more thoroughly understood through reference to the accompanying single figure which is a section taken through a marker that is circular in plan and comprises a circular disc 10 provided with an annular flange 10A, which surrounds a dished lens or window 11. A layer 12 of suitable radio-active zinc sulfide paint is applied on the inside or concave surface of the lens. A second disc 13 is provided with a circular boss 14 which is fitted into the cavity in the first disc, the edges of the discs being sealed together by a thermoplastic bond 15 formed by heating the edges of the two discs under pressure. In consequence of the method of sealing a partial vacuum is created in the space 16 between the discs.

The disc 10 or at least the lens or window thereof should be of clear plastic, for example, clear polystyrene. The back or second disc 13 preferably is made of polystyrene, but need not be transparent.

In assembling the apparatus shown in the drawing, the radio-active paint, i. e., radio-active zinc sulfide pigment in a suitable binder, is painted on the concave side of the lens, so as to cover substantially entirely the inside surface of the disc 10, except for the flange. The painted disc is then subjected to drying, preferably at a pressure less than atmospheric, to assure complete removal of moisture. After the painted disc has been dried thoroughly the second or back disc is fitted on it and the assembled discs are placed in a press which simultaneously applies heat and pressure to the juxtaposed rims or flanges of the two discs. If desired, a suitable cement may be employed. In the case of the polystyrene discs, a suitable cement is made by dissolving polystyrene in amyl acetate. The heat and pressure employed in joining the discs together are such as to create a partial vacuum, i. e. a pressure substantially less than atmospheric in the space enclosed by the discs. At the same time the heat and pressure tend to remove any moisture which might be present in the layer of zinc sulfide pigment.

In bonding the discs together the heat and pressure applied should be adequate to render the edges of the discs plastic while the centers thereof remain relatively stiff. At the same time, the gas enclosed in the space within the disc is heated so that a substantial proportion of it is expelled from the space and passes out between the rims before the bond is formed completely. When the bond has been formed and the structure has cooled, a partial vacuum is developed in the enclosed space, provided of course that the plastic is stiff enough.

As indicated above, when the discs are bonded together, so that a complete seal is formed, the resulting marker is removed from the press and permitted to cool. Thereafter, the marker may be enclosed in a suitable metal badge having a cut-out front or bezel through which the dished lens appears.

The markers made as described above are substantially unbreakable and are unaffected by long exposure to water. Because the radio-active material is thoroughly sealed, the markers present no health hazard. At the same time, since alpha rays and emanations do not penetrate the plastic container, the radio-active efficiency of the marker is very high. Thus, alpha rays (which are the principal factors in producing luminescence of the zinc sulfide) are effectively sealed within the plastic case and are not dissipated. Likewise, emanations, such as radon and thoron, which in turn give off rays are confined within the apparatus and so are usefully employed.

The markers of my invention may be made of various sizes. Conveniently, the marker described in conjunction with the drawing has an outside diameter of about 1½". Thus, the front disc 10 has an outside diameter of $1\frac{7}{16}$". It has a 1" raised center or lens 11 of clear optical polystyrene with a plus 6 diopter curve. The flange 10A, i. e., the rim surrounding the lens, need not be optically clear. The flange on the front disc should be about .030" thick and the optically clear center or lens should be about .025" thick.

The back disc 13 is likewise made of polystyrene and has an outside diameter of $1\frac{7}{16}$". This disc is flat and is about .025" thick.

The two discs enclose about 400 milligrams of luminous zinc sulfide powder in a non-discoloring adhesive applied uniformly on the inside of the lens. The resulting luminous coating is such that it will withstand bending or flexing without cracking, peeling or chipping.

I claim:

1. A luminous marker comprising substantially water-free zinc sulfide containing a radioactive material, a partially evacuated relatively thick-walled container of organic thermoplastic material that is substantially non-absorbent with respect to water, at least a portion of the container wall being transparent, and the pigment being hermetically sealed in said container.

2. A luminous marker comprising substantially dry zinc sulfide pigment containing a radioactive material, two discs of organic thermoplastic material that is substantially non-absorbent with respect to water, the discs being of such thickness as to be impenetrable by emanations and alpha rays from the radio-active material, at least a portion of one of the discs being transparent, and the pigment being hermetically sealed in a partially evacuated space between the two discs.

3. A luminous marker comprising substantially dry zinc sulfide pigment containing a radio-active material, two discs of organic thermoplastic material that is substantially non-absorbent with respect to water, the discs being bonded together thermoplastically at their peripheries and of such thickness as to be impenetrable by emanations and alpha rays from the radio-active material, at least a portion of one of the discs being transparent, and the pigment being hermetically sealed in a partially evacuated space between the two discs.

4. A luminous marker comprising substantially dry zinc sulfide pigment containing a radio-active material, two discs of polytyrene that is substantially non-absorbent with respect to water, the discs being bonded together thermoplastically at their peripheries and of such thickness as to be impenetrable by emanations and alpha rays from the radio-active material, at least a portion of one of the discs being transparent, and the pigment being hermetically sealed in a partially evacuated space between the two discs.

5. A luminous marker comprising substantially dry zinc sulfide pigment containing a radio-active material, two discs of organic thermoplastic material that is substantially non-absorbent with respect to water, the discs being bonded together thermoplastically at their peripheries and of such thickness as to be impenetrable by emanations and alpha rays from the radio-active material, at least one of the discs being transparent, and the pigment being hermetically sealed in a partially evacuated space between the two discs.

6. A luminous marker comprising substantially water-free zinc sulfide containing a radio-active material, a hermetically sealed container having a window of transparent organic thermoplastic material that is substantially non-absorbent with respect to water and is of sufficient thickness to be substantially impenetrable by emanations and alpha rays from the radio-active material, the zinc sulfide being enclosed in the container.

7. A luminous marker comprising substantially water-free zinc sulfide containing a radio-active material, a hermetically sealed container having a window of transparent organic material selected from the group consisting of thermoplastic and thermosetting materials that is substantially non-absorbent with respect to water and is of sufficient thickness to be substantially impenetrable by emanations and alpha rays from the radio-active material, the zinc sulfide being enclosed in the hermetically sealed container.

8. A luminous marker comprising substantially water-free zinc sulfide containing a radio-active material, a hermetically sealed container having a window of transparent organic thermoplastic material that is substantially non-absorbent with respect to water and is of sufficient thickness to be substantially impenetrable by emanations and alpha rays from the radio-active material, the zinc sulfide being disposed within the container and there being a pressure substantially less than atmospheric within the container.

9. A luminous marker comprising substantially dry zinc sulfide pigment containing a radio-active material, two discs of organic thermoplastic material that is substantially non-absorbent with respect to water, the discs being bonded together thermoplastically at their peripheries and of such thickness as to be impenetrable by emanations and alpha rays from the radio-active material, the pigment being hermetically sealed between the two discs in a space having a pressure substantially less than atmospheric, at least a portion of one of the discs being transparent with the pigment fastened to the inside surface of this disc with an adhesive.

10. A luminous marker comprising substantially dry zinc sulfide pigment containing a radio-active material, two discs of organic thermoplastic material that is substantially non-absorbent with respect to water, the discs being bonded together thermoplastically at their peripheries to enclose hermetically sealed space having a pressure substantially less than atmospheric, the zinc oxide pigment being disposed within said space, the discs being of such thickness as to be impenetrable by emanations and alpha rays from the radio-active material with one of the discs dished and the other provided with a boss which fits into the cavity of the first disc, at least one of the discs being transparent.

JOHN E. PAUL.